United States Patent
Fukushima et al.

(10) Patent No.: US 7,095,870 B2
(45) Date of Patent: Aug. 22, 2006

(54) ELECTRONIC WATERMARK EMBEDDING APPARATUS AND METHOD AND A FORMAT CONVERSION DEVICE HAVING A WATERMARK EMBEDDING FUNCTION

(75) Inventors: Akio Fukushima, Yokohama (JP); Hiroyuki Kimura, Hiratsuka (JP); Michihiro Tateishi, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 803 days.

(21) Appl. No.: 09/944,454

(22) Filed: Aug. 30, 2001

(65) Prior Publication Data

US 2002/0090111 A1    Jul. 11, 2002

(30) Foreign Application Priority Data

Dec. 21, 2000  (JP) .............................. 2000-393269
Dec. 21, 2000  (JP) .............................. 2000-393270

(51) Int. Cl.
*G06K 9/00* (2006.01)
*G06K 9/36* (2006.01)
*G06K 9/46* (2006.01)

(52) U.S. Cl. ...................... 382/100; 382/232; 382/250; 382/251

(58) Field of Classification Search ................ 382/100, 382/250, 251
See application file for complete search history.

(56) References Cited

U.S. PATENT DOCUMENTS 5,748,763 A    5/1998   Rhoads
6,154,571 A *  11/2000  Cox et al. .................... 382/250
6,208,745 B1 * 3/2001   Florencio et al. ........... 382/100
6,246,802 B1 * 6/2001   Fujihara et al. ............. 382/276
6,298,142 B1 * 10/2001  Nakano et al. .............. 382/100
6,553,127 B1 * 4/2003   Kurowski .................... 382/100
6,639,996 B1 * 10/2003  Suda .......................... 382/100
2001/0010707 A1 * 8/2001  Matsumura et al. .... 375/240.24
2002/0009209 A1 * 1/2002  Inoue et al. ................. 382/100
2002/0012446 A1 * 1/2002  Tanaka ........................ 382/100

* cited by examiner

*Primary Examiner*—Bhavesh M. Mehta
*Assistant Examiner*—John Strege
(74) *Attorney, Agent, or Firm*—Townsend and Townsend and Crew LLP

(57) ABSTRACT

In an electronic watermark embedding technique, even when image data compression such as MPEG2 compression is conducted for image data of an image including a watermark while keeping deterioration of picture quality within an allowed range, the electronic watermark is kept retained. A watermark embedding operation and an MPEG2 encoding operation as well as a watermark detecting operation are cooperatively executed. Specifically, in the WM embedding operation, information regarding an operation state of an MPEG2 encoder, particularly, information regarding an amount of data is received. According to the received information of data, parameters such as the total amount of the watermark to be embedded, strength thereof, and an embedding position thereof are controlled.

40 Claims, 6 Drawing Sheets

FIG.5

$$
\begin{pmatrix}
8 & 16 & 19 & 22 & 26 & 27 & 29 & 34 \\
16 & 16 & 22 & 24 & 27 & 29 & 34 & 37 \\
19 & 22 & 26 & 27 & 29 & 34 & 34 & 38 \\
22 & 22 & 26 & 27 & 29 & 34 & 37 & 40 \\
22 & 26 & 27 & 29 & 32 & 35 & 40 & 48 \\
26 & 27 & 29 & 32 & 35 & 40 & 48 & 58 \\
26 & 27 & 29 & 34 & 38 & 46 & 56 & 69 \\
27 & 29 & 35 & 38 & 46 & 56 & 69 & 83
\end{pmatrix}
\otimes
\begin{pmatrix}
1 & 1 & 1 & 1 & 1 & 1 & 2 & 2 \\
1 & 1 & 1 & 1 & 1 & 1 & 2 & 2 \\
1 & 1 & 1 & 1 & 1 & 1 & 2 & 2 \\
1 & 1 & 1 & 1 & 1 & 1 & 2 & 2 \\
1 & 1 & 1 & 1 & 1 & 2 & 2 & 2 \\
1 & 1 & 1 & 1 & 2 & 2 & 2 & 2 \\
2 & 2 & 2 & 2 & 2 & 2 & 2 & 2 \\
2 & 2 & 2 & 2 & 2 & 2 & 2 & 2
\end{pmatrix}
=
\begin{pmatrix}
8 & 16 & 19 & 22 & 26 & 27 & 58 & 68 \\
16 & 16 & 22 & 24 & 27 & 29 & 68 & 74 \\
19 & 22 & 26 & 27 & 29 & 34 & 68 & 76 \\
22 & 22 & 26 & 27 & 29 & 34 & 74 & 80 \\
22 & 26 & 27 & 29 & 32 & 70 & 80 & 96 \\
26 & 27 & 29 & 32 & 70 & 76 & 92 & 116 \\
52 & 54 & 58 & 68 & 76 & 92 & 112 & 138 \\
54 & 58 & 70 & 76 & 80 & 96 & 138 & 166
\end{pmatrix}
$$

DEFAULT VALUES FOR INTRA-QUANTIZER-MATRIX  ⊗  WEIGHTING COEFFICIENT DATA FOR INTRA-QUANTIZER-MATRIX  =  TRANSFORMED INTRA-QUANTIZER-MATRIX

MULTIPLICATION

ELECTRONIC WATERMARK EMBEDDING APPARATUS AND METHOD AND A FORMAT CONVERSION DEVICE HAVING A WATERMARK EMBEDDING FUNCTION

BACKGROUND OF THE INVENTION

The present invention relates to an electronic watermark embedding apparatus to embed watermark data in image data, an image data format conversion device having an electronic watermark embedding function, and a method of embedding an electronic watermark, and in particular, to an image data processing apparatus having a function to execute an electronic watermark embedding operation in combination with a moving picture coding experts group (MPEG) 2 image format conversion.

A technique to embed particular data in various data such as video or image data, audio or voice data, and text data is called, for example, "steganography", "watermark technique", or "electronic watermark technique". Heretofore, in the field of this technique, study and research have been conducted to embed related identifier information or a comment in the image data, audio data, and/or text data.

The technique has been recently applied to a field in which data to protect a copyright of such information is embedded in original data to be protected so as to thereby prevent illegal operations, for example, illegal production of copies of the data. Such techniques are described in, for example, U.S. Pat. No. 5,748,763 issued to Rhoads on May 5, 1998 and entitled "Image Steganography System Featuring Perceptually Adaptive and Globally Scalable Signal Embedding".

When the original data is processed, for example, filtered and/or compressed and quality of the data is deteriorated, the data embedded in the original data cannot function to prevent the illegal operations. To overcome this difficulty, the data embedding method is devised so that the embedded data is still valid even after the original data is processed as above.

The original data is restricted in various levels according to the copyright. For example, the data can be freely copied, the copy of the data is prohibited, or the data can be copied only once. In such a situation, it is also possible to embed, in the original data, data associated with the restriction level. The copy operation is controlled by detecting the embedded data.

SUMMARY OF THE INVENTION

Heretofore, image data is first compressed in an image data compressing method such as an MPEG2 method and is then recorded on an optical disk or hard disk for the following reasons. (1) The original data has an enormous amount and hence cannot be practically used without compressing the data. (2) The image data compressing method such as the MPEG2 method can compress the original data into compressed data having picture quality which can be practically used, the volume of compressed data being about "several tenths" of that of the original data.

Assume as an example a case in which the compression (encoding) and expansion (decoding) of image data of MPEG2 practically used in digital versatile disk (DVD) video systems are specifically applied to image data in which an electronic watermark is embedded.

The electronic watermark is used to protect the copyright of image data as described above. Consequently, the electronic watermark must be detected even in image data for which an MPEG2 encoding operation to preserve the image data and a decoding operation to reproduce the image data have been conducted. Therefore, the embedded electronic watermark cannot fade or vanish as a result of the ordinary MPEG2 encoding and decoding. However, the video or image data compression of MPEG2 is an irreversible coding system, and hence some information inevitably fades in general. Particularly, to reduce the amount of data in the MPEG2 method, data of high-frequency components of various spatial frequency components of an image is rounded and hence the precision of data is lowered. Therefore, when the electronic watermark includes high-frequency components, the precision of the data of the electronic watermark is lowered and the data fades in the worst case. There consequently may occur a problem in which the MPEG2 processing lowers reliability in the detection of the electronic watermark.

On the other hand, the embedding of an electronic watermark is an operation to modify the original data, and hence the picture quality of the data is inevitably reduced. Therefore, an operation to enhance the embedding of the electronic watermark to prevent the lowering of the reliability in the detection of the electronic watermark is limited in consideration of the deterioration in the picture quality. In the embedding of the electronic watermark, the detection of the electronic watermark must be guaranteed while keeping the deterioration of the picture quality within an allowed range.

In other words, when the electronic watermark is used, it is essentially required to solve the problem of the deterioration in the detection of the electronic watermark according to the MPEG2 system and the problem of the deterioration in the picture quality. However, the electronic watermark embedding of the prior art and the MPEG2 processing are completely different from each other. Both processing techniques have not been used in consideration of mutual influences. Therefore, it has been difficult to actually satisfy the requirements above in practical cases.

It is therefore an object of the present invention to provide an electronic watermark embedding technique which develops a watermark and which puts the watermark to practices to thereby protect the copyright of image data, the electronic watermark not fading or vanishing even when the MPEG processing such as image data compression is conducted for the image data while keeping the deterioration of the image quality within an allowed range.

To achieve the object, according to one aspect of the present invention, an electronic watermark embedding operation is combined with an encoding operation such that the contents of the electronic watermark embedding operation are changed according to a result of the encoding operation. This makes it possible to simultaneously solve the problem of the reliability in the detection of the electronic watermark and the problem of the deterioration in the picture quality.

First, description will be given of a procedure of the electronic watermark embedding operation of the prior art and a procedure of an example of the MPEG2 encoding operation.

Image data (to be referred to as "original image" data) in which an "electronic watermark" (to be simply abbreviated as WM hereinbelow) has not been embedded is inputted to a WM embedding device. In the device, the WM is embedded in the original image data and is then outputted as image data with WM. To compress the data quantity before the image data with WM is recorded on a recording medium, the image data with WM is inputted to an MPEG2 encoder. In the encoder, the image data with WM is compressed and is converted into an MPEG2 stream. Therefore, the WM embedding operation is independent of the MPEG2 encoding operation.

By applying the present invention to the MPEG2, the WM embedding operation is conducted in cooperation or association with the MPEG2 encoding operation.

Original image data is inputted to the WM embedding device. In the device, the WM is embedded in the original image data and is then outputted as image data with WM. In this operation, the WM embedding device receives, from the MPEG2 encoder, information regarding operation states at the point of time of the MPEG2 encoder, the information particularly including information (to be referred to as data quantity information herebelow) regarding the quantity of data produced from the MPEG2 encoder. According to information of the data quantity, the WM embedding device controls parameters such as a total amount of WM to be embedded, strength of embedded watermark, and an embedding position thereof.

The information of data amount outputted from the MPEG2 encoder corresponds to an MQUANT value, a quantizer scale code value, and a quantizer matrix value of the MPEG2 technique in general. These information items are inherently used to control parameters in the rounding of values of an encoder in the MPEG2 encoder so that the data amount (bit rate) per unitary time of the MPEG2 stream produced from the MPEG2 encoder is set to a predetermined value. In the configuration of the present invention, by paying attention to a fact that the data amount information is related to the parameters in the rounding of values of an encoder in the MPEG2 encoder and a degree of fading of data by the rounding can be estimated according to the data amount information, the data amount information is fed back to the WM embedding operation so that the total amount of WM to be embedded, the strength of embedded watermark, and the embedding position change corresponding to a change in the quantizer scale code value. When the quantizer scale code value for the rounding becomes greater due to the bit rate control and the chance of the fading of WM data becomes greater, as a result of adoption of the configuration of the WM embedding device, the WM data to be embedded changes to prevent the fading of the WM data.

According to another aspect of the present invention, an electronic watermark embedding operation, an encoding operation, and an electronic watermark detecting operation are combined with each other to detect an electronic watermark in image data encoded as above, and then the contents of the electronic watermark embedding operation are changed according to a result of the watermark detecting operation. Resultantly, the problem of reliability in the detection of the electronic watermark and the problem of the deterioration in the picture quality can be simultaneously solved.

In the above-described aspect of the present invention described above, the electronic watermark embedding operation is conducted by cooperatively conducting the WM embedding operation, the encoding operation, and a new WM detecting operation. That is, original image data is inputted to the WM embedding device. In the device, an electronic watermark is embedded in the original image data and is than outputted as image data with WM or WM image data. In the WM embedding operation, the WM embedding device receives, from the WM detector, information regarding states of the WM detected by the WM detector in the image data having encoded by the pertinent point of time, particularly, information regarding an amount of WM data thus detected (to be referred to as "WM data amount" herebelow) and controls parameters such as the total amount of WM to be embedded, the strength of embedded watermark, and the embedding position according to the information of the WM data amount.

Resultantly, when the WM data fades by the influence of the encoding operation, the WM embedding device detects this event according to the WM data amount information and then changes the parameters such as the total amount of WM to be embedded, the strength of embedded watermark, and the embedding position to thereby prevent the fading of the WM data.

As a result, the fading of the embedded electronic watermark can be prevented, which guarantees that the embedded electronic watermark is kept retained. Therefore, it is only necessary to embed a minimum amount of data for the electronic watermark, and hence the deterioration in the picture quality can be minimized.

Other objects, features and advantages of the present invention will become apparent from the following description of the embodiments of the invention taken in conjunction with the accompanying drawings.

BRIEF DESCRIPTION OF THE DRAWINGS

FIG. 5 is a diagram to explain a concept of an MPEG2 quantizer matrix value and control of a compression ratio for each spatial frequency component according to the MPEG2 quantizer matrix value.

DETAILED DESCRIPTION OF THE EMBODIMENTS

Description will now be given of an embodiment of the present invention by referring to the accompanying drawings.

Although an MPEG2 encoding operation will be described as an example of the compression of image information, the compression is not limited to the MPEG2 encoding operation. That is, the present invention can be applied to various image data compression methods employing a method of reducing the amount of high-frequency component data such as a method using a discrete cosine transform of MPEG1 and/or MPEG4 and a method using a wavelet transformation.

In the example, the WM data to be embedded is copy control information for the copyright protection. However, the WM data is not limited to the copy control information, but may be information representing a type of original image data, relational information associated with original data.

Figure 1:
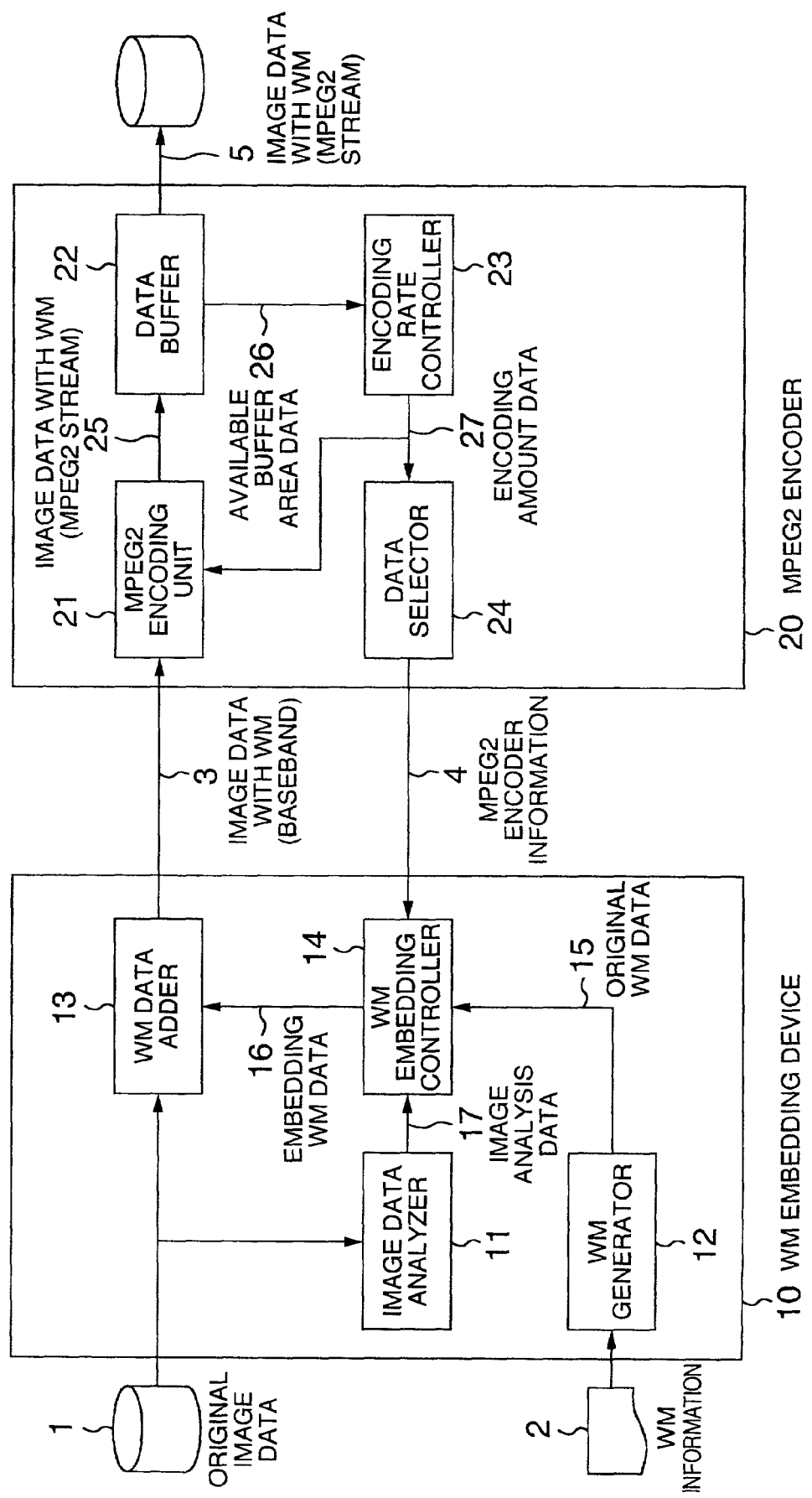
FIG. 1 is a block circuit diagram showing a first embodiment of a configuration to implement an electronic watermark embedding apparatus, a format converter having an electronic watermark embedding function, and an electronic watermark embedding method according to the present invention.

FIG. 1 shows, in a block circuit diagram, a first embodiment of a configuration to implement an electronic watermark embedding apparatus, a format converter having an electronic watermark embedding function, and an electronic watermark embedding method according to the present invention.

The configuration of FIG. 1 includes original image data 1, electronic watermark (WM) information 2 to be embedded in the original image data 1, baseband image data with WM 3 in which an electronic watermark has been embedded by an WM embedding device 10 (which will be described later), MPEG2 encoder information 4 outputted from an MPEG encoder 20 (which will be described later), and MPEG2-stream image data with WM 5 outputted from the MPEG2 encoder 20.

The embedding device 10 includes an image data analyzer 11 which analyzes properties of the original image data 1 and outputs image analysis data 17, a WM generator 12 to generate original WM data 15 using WM information 2 inputted thereto, a WM embedding controller 14 which controls original WM data 15 using the MPEG2 encoder information 4 and the image analysis data 17 and which generates embedding WM data 16 to be actually embedded in the original image data 1, and a WM adder 13 which adds the embedding WM data 16 to the image data 1 and which outputs the baseband image data with WM 3.

The MPEG encoder 20 includes an MPEG2 encoding unit 21 which encodes the baseband image data with WM 3 according to encoding indication data 27 and using a predetermined algorithm and which outputs image data with WM 25 in an MPEG2 format, a data buffer 22 which buffers the MPEG2-format image data with WM 25 to output the MPEG2-stream image data with WM 5 and which outputs an available buffer area data 26 to control the bit rate (a data amount per unitary time) for the MPEG2 stream outputted from the MPEG2 encoder 20, an encoding rate controller 23 which generates encoding indication data 27 to control the encoding rate generated by the MPEG2 encoding unit 21 according to the available buffer area data 26, and a data selector 24 which select parameter data necessary for the WM embedding device 10 from the encoding indication data 27 and which outputs the MPEG2 encoder information 4.

Next, description will be given of an output line the WM embedding method in the embodiment.

The original image data 1 is image data of digitized signals in various formats. As an example, the data is formatted in this description as below. One frame of image data includes 720 horizontal pixels and 480 vertical pixels. Each frame represents an image using three kinds of data including a luminance component Y and color components Cr and Cb. Each of the pixels of Y, Cr, and Cb data is represented by ten bits.

The WM information 2 is specified for the copyright protection. For example, "copy free (the copies can be freely produced)", "never copy (the copy is prohibited), or "copy once (the copy is once allowed)" is specified as a mode of protection. The WM generator 12 generates the original WM data 15 according to the specified WM information.

Description will now given of WM data in the electronic watermark technique.

The WM data is used to slightly change the original image data. By assigning a particular meaning to the contents of the change, information is embedded in the original image data. In the detection of the WM, only the change is separated and is extracted from the original image. The embedded information is obtained according to the contents of the change.

Figure 3:
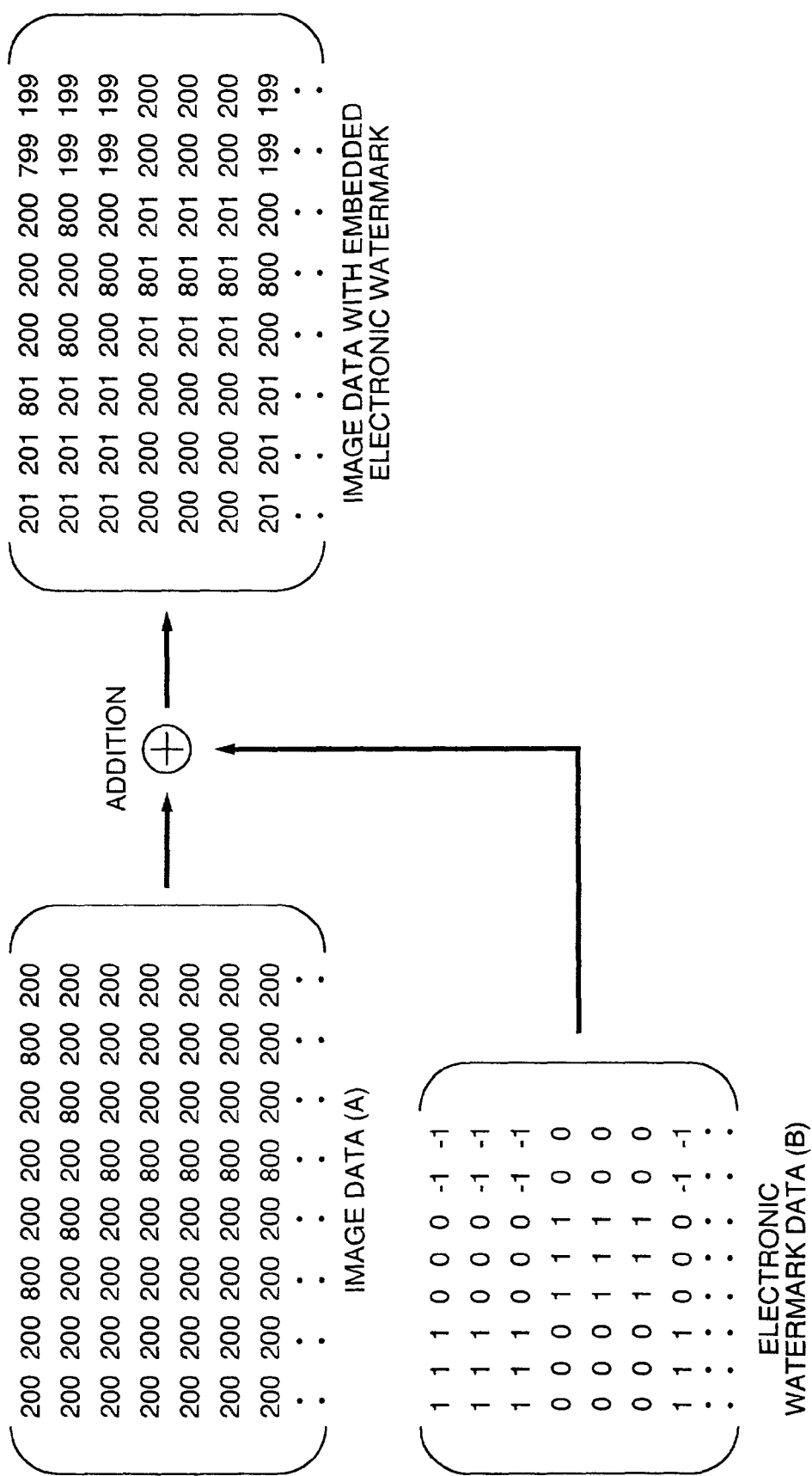
FIG. 3 is a diagram to explain a concept of original image data, original WM data, and image data with WM according to the present invention.

The operation will be concretely described. For example, for original image data (A) represented in a two-dimensional array as shown in FIG. 3, electronic watermark data (B) is set as a two-dimensional array equal in size with that of the original image data (A). By adding the electronic watermark data (B) to the original image data (A), information is embedded therein. In the operation, to minimize any adverse influence on the original image, the absolute value of each element of the electronic watermark data (B) is fully less than that of each associated element of the original image data (A).

Since WM data partly fades in the MPEG2 encoding, it is difficult to detect all embedded WM data. Therefore, the original WM data 15 must be created such that the WM information 2 can be correctly restored even from part of WM data detected. That is, information necessary to restore the WM information 2 is repeatedly embedded in a plurality of positions in the screen image.

To minimize the deterioration in the picture quality by the embedding of the WM data in the original image data 1, the WM data is embedded in positions only if the embedding of WM data therein slightly deteriorates the picture quality. Therefore, actually, the generated original WM data 15 cannot be entirely embedded in the image data 1 as described for FIG. 3.

To minimize the deterioration in the original image by the WM embedding, the image data analyzer 11 is used to determine a position in which the watermark can be embedded without clearly deteriorating the image and a WM level at which the watermark can be embedded for the following reasons associated with the visual sense of humans. For example, when brightness or luminance and hue are slightly changed in the original image by embedding the WM therein, the change is remarkably recognized in a section of the original image in which the luminance distribution is uniform and in which the image little moves. However, in a section of the original image in which the luminance distribution is not uniform and in which the image clearly moves, the change is rarely perceived by the viewer. According to this fact, the watermark is embedded in the original image data such that the change of the data due to the embedding of the watermark is possibly concealed from the viewer.

For this purpose, the image data analyzer 11 analyzes the image data using various parameters such as the amount of information of the image data, data values of respective pixels in the screen, a deviation of pixel data values, magnitude of change of pixel data values with respect to space/time, and directions and magnitude of motion vectors. The image data analyzer 11 outputs results of the analysis as image analysis data 17.

The WM embedding controller 14 generates, according to the image analysis data 17, control data indicating a position in which the watermark can be embedded without being remarkably perceived by the human and a WM level at which the watermark is to be embedded. For example, in a contour section of the original image in which brightness abruptly changes, even if the WM data is embedded and the original image is accordingly changed, such a change cannot be clearly perceived because of the change in the original image and hence the WM data is rarely perceivable. When the change in brightness in the contour section is more abrupt and the magnitude of change is greater, it is possible to embed a larger amount of WM data. The control data generated according to the rules is used as weighting coefficients for the original WM data 15. That is, the coefficients are multiplied by the data 15 to resultantly generate the embedding WM data 16.

Figure 4:
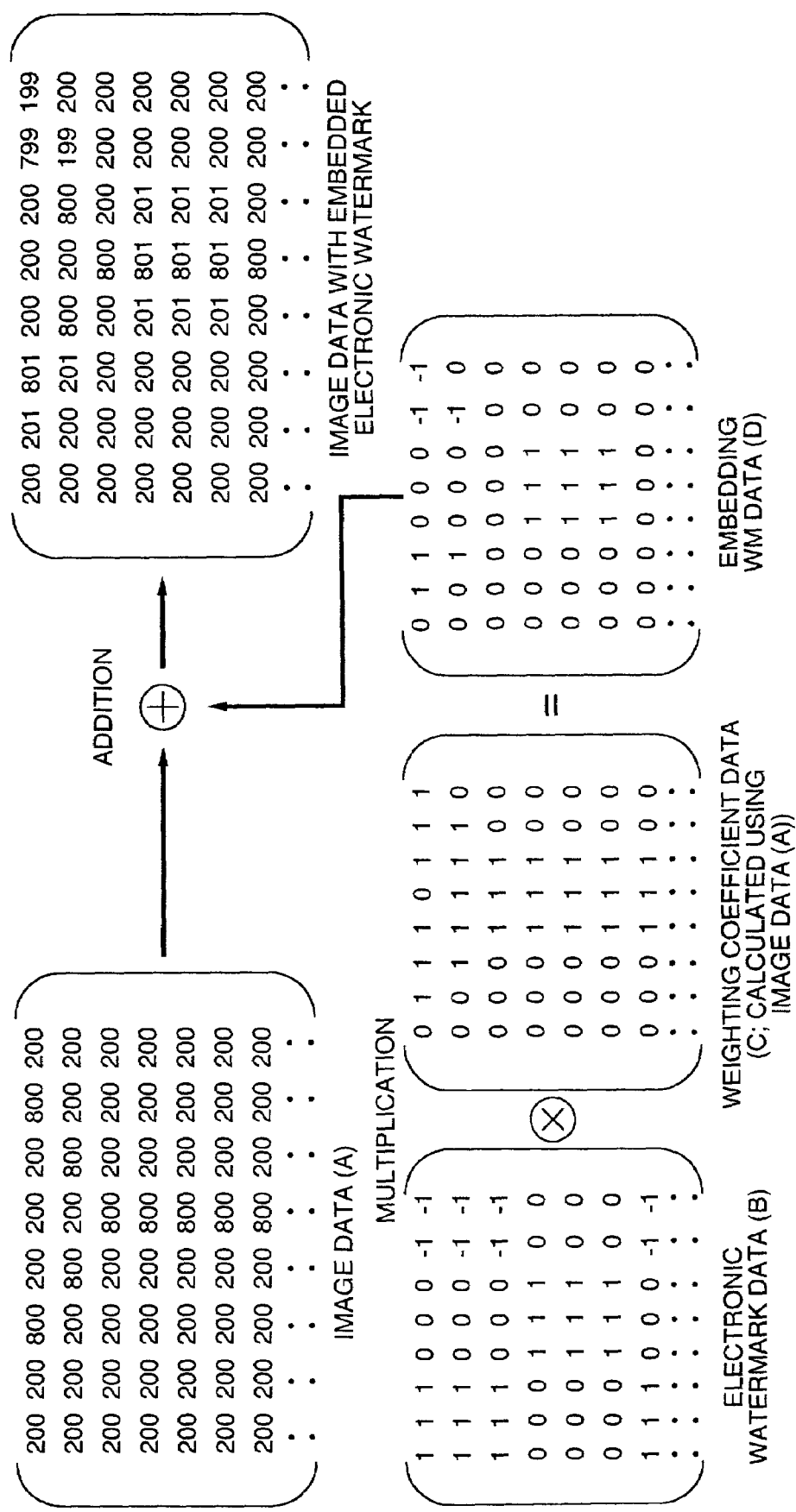
FIG. 4 is a diagram to explain a concept of original image data, original WM data, WM weighting data, embedded WM data, and image data with WM according to the present invention.

The operation will be specifically described. For example, as shown in FIG. 4, for original image data (A) represented as a two-dimensional array, electronic watermark data (B) is set similarly as a two-dimensional array equal in size to the original image data (A), and weighting coefficient data (C) calculated using the image analysis data 17 is also set similarly as a two-dimensional array equal in size to the original image data (A). In the WM embedding operation, the electronic watermark data (B) is multiplied by the weighting coefficient data (C) to generate embedding WM data (D). Thereafter, the embedding WM data (D) is added to the original image data (A). In the operation, when the absolute value of each element of the embedding WM data (D) is fully less than that of each associated element of the original image data (A), the adverse influence on the original image can be minimized as described above.

In an actual operation to generate the embedding WM data 16, there are employed, for example, three frame memories, i.e., first to third frame memories each of which has a memory capacity of one frame of original image data. In the configuration, the first frame memory stores control data, the second frame memory original WM data, and the third frame memory the embedding WM data. In operation, for a particular pixel, data is stored in the first frame memory to store control data of the pertinent pixel and data is stored in the second frame memory to store original WM data of the pertinent pixel. Thereafter, data items associated with the pertinent pixel are read respectively from the first and second frame memories. A multiplication is conducted between the data items and a result of the multiplication is stored in an area corresponding to the pertinent pixel in the third frame memory. The processing above is executed for all pixels to resultantly generate the embedding WM data of one frame.

It is to be understood that the method of generating the embedding WM data is not limited to the method above. For example, the data may be stored in the first or second frame memory in place of the third frame memory to thereby reduce the number of frame memories required for the processing.

The embedding WM data thus generated is added by the WM data adder 13 to the original image data 1 in a pixel-by-pixel fashion to generate the image data with WM 3.

In this connection, the WM embedding controller 14 also receives the MPEG2 encoder information 4 from the MPEG2 encoder 20, which will be described later.

Next, the MPEG2 encoding operation will be described.

In the MPEG2 encoding operation, to keep the amount of data per unitary time (bit rate) of the MPEG2 stream from the MPEG2 encoder below a predetermined value (the maximum bit rate of the pertinent transmission path in most cases), it is necessary to control the bit rate of data from the MPEG2 encoder. For this purpose, the amount of codes per unitary time to be generated must be controlled, specifically, by the quantization (rounding) operation according to parameters such as the quantizer characteristic (MQUANT) value, the quantizer scale code value, and the quantizer matrix value.

Description will now be given of a method of controlling the bit rate of data outputted from the MPEG2 encoder. In the MPEG2 encoder, the encoding unit conducts a discrete cosine transformation (DCT) for data inputted thereto and then conducts quantization for the data.

In the quantization, an encoding control unit (not shown) specifies quantization characteristic information (to determine a method of transforming the MQUANT value into the quantizer scale code) and the MQUANT value. Using these two information items, a quantizer scale code value [q] is obtained. The quantizer scale code value [q] is multiplied by the quantizer matrix value ([aij]; i=0, 1, 2, . . . , 7, j=0, 1, 2, . . . , 7) to generate a value (q·[aij]; quantizer step value). Using the quantizer step value, there is obtained matrix data ([bij]) for which the DCT has been conducted. Fractional parts of the results ([bij]/q·[aij]) are employed as quantized data, thereby completing the quantization (rounding) operation.

The data resultant from the quantization (rounding) has been quantized according to a quantizing step employed therein. Therefore, a data value difference between two data items before the quantization vanished by the quantization if the difference is less than the value of the quantizing step. That is, the two data items are converted into the same data items, and hence the amount of information is compressed (reduced).

In the rounding operation, when the quantizing step value becomes greater, the range of data items in which the data items are transformed into the same data items is expanded, and hence the amount of information can be further decreased. Therefore, the amount of information can be controlled by adjusting the MQUANT value and the quantizer matrix value.

Ordinarily, the MPEG2 encoder controls the amount of generated information as follows. In this configuration, the encoding rate controller 23 is configured to operate as follows. The quantized data is inputted to the data buffer 22. The data is read from the buffer 22 at a predetermined data transfer rate. When the available buffer area data 26 indicates an increase in the available area (not reserved yet), the MQUANT value and the quantizer scale code value [q] are decreased to increase the amount of generating information. This decreases the quantizing step value and the compression ratio of the amount of information becomes lower. Conversely, when the available buffer area data 26 indicates a decrease in the available area (not reserved yet), the MQUANT value and the quantizer scale code value (q) are increased to decrease the amount of generating information. This increases the quantizing step value and the compression ratio of the amount of information becomes higher. Resultantly, it is possible to keep the amount of generated information at a predetermined value, and hence the bit rate of the data generated from the MPEG2 can be set to a predetermined value.

Naturally, a similar advantage can be obtained by controlling the quantizer matrix value ([aij]; i=0, 1, 2, . . . , 7, j=0, 1, 2, . . . , 7). In this case, a one-to-one correspondence exists between the values of the element of the quantizer matrix and the matrix data after the DCT operation. The operation has therefore a feature as follows. That is, by individually controlling the values of the element of the quantizer matrix, it is possible to control the value of the quantizing step for each frequency component decomposed into a spatial frequency spectral as a result of the DCT operation.

Description will now be specifically given of the control operation using the quantizer matrix value. For example, default values of the intra-quantizer (I-picture quantizer) matrix are as shown in FIG. 5. In the setting of this matrix, elements of lower spatial frequencies in an upper-left section of the matrix have lower quantizer matrix values and elements of higher spatial frequencies in a lower-right section of the matrix have higher quantizer matrix values.

When the quantization is carried out using the default values, the higher quantizing step is applied to the components of the higher spatial frequency. This increases the information compression ratio. However, the quantizer matrix value is variable. For example, when it is desired to increase the information compression ratio for particular spatial frequency components, the quantization can be appropriately controlled by increasing the values of elements of the matrix corresponding to the spatial frequency components. FIG. 5 shows an example of values of the intra-quantizer matrix in which the weighting value for the elements of the higher spatial frequency components is twice the weighting value for the other elements.

Next, description will be given of a relationship between the WM data and the quantization (rounding). In general, to prevent deterioration of the picture quality by changing original image data, the magnitude ($\Delta N_{WM}$) of the WM data is fully less than that of the original image data value ($N_{PICTURE}$; $N_{PICTURE} \gg \Delta N_{WM}$). Consequently, the quantizer scale code value ($\Delta N_{QS}$) in the rounding operation in the ordinary MPEG2 encoding is more than the magnitude ($\Delta_{WM}$) of the WM data in many cases. Resultantly, many WM data items fade in the rounding operation.

Statistically, the WM data remains in the rounding operation at a probability of $\Delta N_{WM}/\Delta N_{QS}$ and the WM data fades therein at a probability of $1-\Delta N_{WM}/\Delta N_{QS}$. The WM data is repeatedly embedded in the original image data in consideration of the fading thereof. Therefore, in ordinary cases, the WM information can be restored using the WM data remaining after the rounding operation.

However, assume a case in which the image data 1 successively includes images each of which has an amount of information larger than an ordinary amount thereof. To set the amount of generated information to a value not exceeding the predetermined bit rate, the MPEG2 encoder attempts to increase the MQUANT value and the quantizer scale code value ($\Delta N_{QS}$) to decrease the amount of data outputted from the MPEG2 encoder. This results in a problem, that is, when the WM data fades and exceeds a WM detection limit, there continuously occurs a state in which the WM information cannot be restored.

To overcome this difficulty according to the present invention, the MPEG2 encoder information 4 is also fed from the MPEG2 encoder 20 to the WM embedding controller 14 so that the controller 14 controls the embedding WM data 16 according to the state (the MQUANT value or the quantizer scale code value) of the quantization in the MPEG2 encoding. For example, when the MPEG2 encoder information 4 indicates increase in the MQUANT value or the quantizer scale code value, the WM data easily fades in the rounding operation and hence the substantially embedded WM data decreases. In this case, therefore, the WM embedding device 10 detects, in the MPEG2 encoder information 4, a state in which the WM data easily fades in the rounding operation and then increases the WM data 16 to be embedded in the original image data. That is, the WM embedding device 10 conducts a WM level correction to prevent the decrease in the WM data to be embedded in the data stream after the MPEG2 encoding. Concretely, when the quantizer scale code value becomes k times the initial value thereof, the magnitude of WM data is set to a value obtained by multiplying the initial value thereof by k. As a result, the WM data is rarely influenced by the rounding operation and hence it is possible to prevent the fading of the WM data.

Description will now be specifically given of the operation of the MPEG2 encoder to control the WM embedding according to the quantization state. When at least one of the quantizer scale code value, the MQUANT value, and the quantizer matrix value increases, the number of quantizing steps increases and the compression ratio of image information increases. Resultantly, the WM data easily fades in the quantization. Assume that x represents a value including at least one of the quantizer scale code value, the MQUANT value, and the quantizer matrix value and y represents the image information amount signal. Assume a function y=f(x), $dy/dx \geq 0$, where y increases if x increases. Moreover, the electronic watermark embedding device is provided with a function to prevent the fading of the electronic watermark in which when the image information amount signal increases, the amount of embedded electronic watermark and/or the strength of embedded watermark are/is changed and/or the electronic watermark embedding position is changed.

As an application of the embodiment, there may be employed; in place of at least one of the quantizer scale code value, the MQUANT value, and the quantizer matrix value; a relationship between functions such as x=g (x1, x2, x3), $dx/dx1 \geq 0$, $dx/dx2 \geq 0$, and $dx/dx3 \geq 0$, where x1 is the quantizer scale code value, x2 is the MQUANT value, and x3 is the magnitude of the quantizer matrix.

The fading of the WM data can be prevented by a control operation to correct the WM level according to the quantization state of the MPEG2 encoder.

In addition to the control operation of the WM level correction, it is also possible to conduct an embedding position control operation, which will be described later, to change the WM embedding position in the screen according to the magnitude of the embedding WM data.

In the embedding position control operation, the WM embedding position in the screen is changed according to the WM data. For example, when the MQUANT value becomes greater, in a section of the screen in which a slight change takes place as a result of the rounding operation, most values are likely to be converted into the uniform values. If the WM data is embedding in this section, the WM data is remarkably perceived. In such a situation, the embedding position control operation is conducted to decrease the amount of WM data embedded in the pertinent section. The control operation may be conducted to increase the amount of WM data embedded in a contour section in which brightness changes. Moreover, the control operation to decrease the amount of WM data embedded in the section in which the change is small and the control operation to increase the amount of WM data embedded in a contour section associated with the brightness change may be conducted at the same time.

Additionally, the amount of the WM data to be embedded, the strength of embedded WM data, and the embedding position thereof may be controlled for a particular frequency component of the WM data. For example, in a case in which the image information amount signal indicates that a particular spatial frequency component occupies a large part, if WM data having a frequency similar to the pertinent spatial frequency is embedded, interference occurs therebetween to form an interference pattern. This results in a problem that the WM data is clearly perceived. To cope with this drawback, the following steps are required. (1) The particular spatial frequency component which has a spatial frequency similar to the spatial frequency of the original image data and which causes the interference pattern is minimized in the original WM data. (2) In each partition area of the screen, a spatial frequency spectrum of the original image data is examined. Only in screen areas in which the interference pattern possibly occurs, the strength of embedded WM data is lowered. (3) In each partition area of the screen, a spatial frequency spectrum of original image data is examined, in screen areas in which the interference pattern possibly occurs, the strength of a particular spatial frequency component which causes the interference pattern is lowered in the original WM data.

In this situation, the WM data is beforehand subdivided into components of a plurality of bands on the spatial frequency axis. For example, there are detected the WM data components of spatial frequency bands which can be superimposed, without causing any problem such as occurrence of the interference pattern, onto primary spatial frequency components of original image data obtained from the image information amount signal. The WM data components are then added to the original image data in the WM embedding. Alternatively, WM data components of spatial frequency bands which possibly cause an interference pattern are multiplied by a coefficient less than a coefficient for WM data components of other spatial frequency bands. WM data resultant from the multiplication is added to the original image data in the WM embedding.

The spatial frequency spectrum of WM data is a broad spectrum in general. That is, energy rarely concentrates on a particular spatial frequency in the WM data. Therefore, even when the WM data component of the particular spatial frequency is removed from the WM data, it hardly occurs that the WM detecting capability is adversely influenced.

In the configuration as above, the problem of the deterioration in the WM detecting capability can be removed. In general, the picture quality is easily lowered when the amount of embedded WM data is increased as above. However, the processing above is executed in a state in which the WM data 16 easily fades in the rounding operation. Therefore, the increase in the amount of embedded WM data cancels out the decrease in the WM data by the rounding operation. As a result, the amount of WM data embedded in the MPEG2 stream is kept unchanged, and hence the problem of the deterioration in the picture quality rarely occurs.

By cooperatively configuring the electronic watermark embedding device and the MPEG2 encoder as above, there can be achieved an electronic embedding apparatus in which it is possible to prevent the embedded WM data from fading in the MPEG2 encoding operation and the deterioration in the picture quality can be minimized. This resultantly removes the problem above.

Next, description will be given of a second embodiment of the present invention.

In comparison with the first embodiment, different points of the second embodiment will be described in detail.

Figure 2:
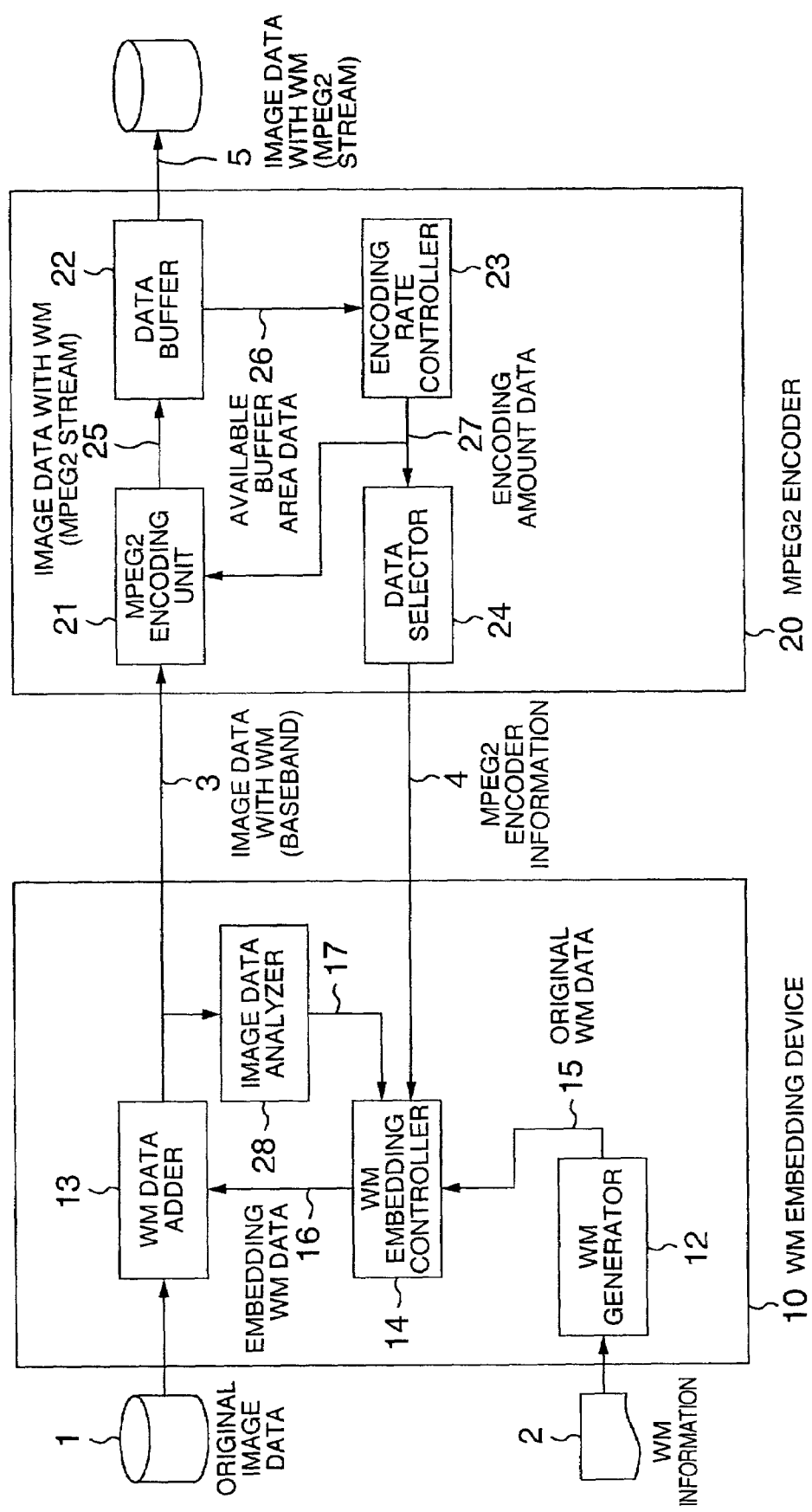
FIG. 2 is a block circuit diagram showing a second embodiment of a configuration to implement an electronic watermark embedding apparatus, a format converter having an electronic watermark embedding function, and an electronic watermark embedding method according to the present invention.

FIG. 2 shows an embodiment of a configuration to implement an electronic watermark embedding apparatus, a format converter having an electronic watermark embedding function, and an electronic watermark embedding method according to the present invention.

The configuration of FIG. 2 differs from that of FIG. 1 in that an image data analyzer 28 analyzes properties of image data with WM (baseband) 3 to produce image analysis data 17.

While the original image data 1 is fed as an input signal to the image data analyzer 11 in the first embodiment, the image data with WM (baseband) 3 is supplied as an input signal to the image data analyzer 28 in the second embodiment.

As in the first embodiment, to minimize the deterioration in the picture quality of the original image by the WM embedding operation, the image data analyzer 28 is used to determine a position in which the watermark can be embedded without clearly deteriorating the original image and a WM level at which the watermark can be embedded. For this purpose, specifically, the image data analyzer 28 analyzes the image data using various parameters such as the amount of information of the image data, pixel data values of respective pixels in the screen, a deviation of pixel data values, magnitude of change of pixel data values with respect to space/time, and directions and magnitude of motion vectors. Thereafter, the image data analyzer 28 outputs results of the analysis as image analysis data 17.

In this embodiment, an advantageous effect can be obtained by conducting the image analysis for the image data with WM (baseband) in which the WM data is beforehand embedded. That is, since influence of a fine change caused by the WM embedding operation is also incorporated in the results of the analysis, there is constructed a feedback control system for the WM control operation. In comparison with the feedforward control system as shown in the first embodiment, the feedback control system of the second embodiment can more appropriately conduct the WM embedding operation.

Figure 6:
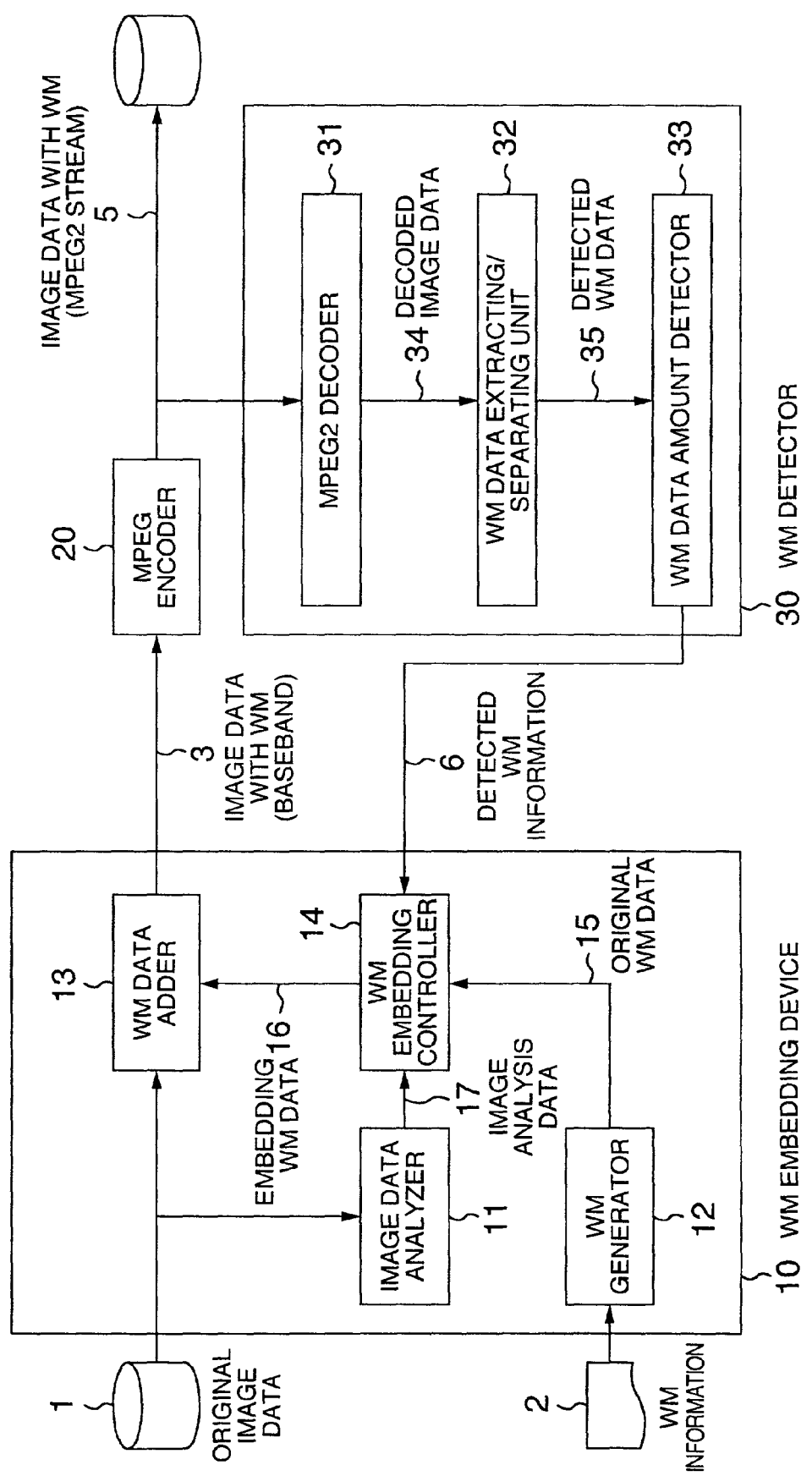
FIG. 6 is a block circuit diagram showing a third embodiment of a configuration to implement an electronic watermark embedding apparatus, a format converter having an electronic watermark embedding function, and an electronic watermark embedding method according to the present invention.

FIG. 6 shows a third embodiment of the present invention.

In FIG. 6, a WM embedding device 10 is substantially the same as that shown in the embodiment of FIG. 1.

An MPEG2 encoding unit 20 receives the image data with WM (baseband) 3 inputted thereto and encodes the data 3 according to an algorithm stipulated by MPEG2 to produce MPEG2-stream image data with WM 5.

A WM detector 30 includes an MPEG2 decoding unit 31 which receives the MPEG2-stream image data with WM 5 inputted thereto and decodes the data 5 according to an algorithm stipulated by MPEG2 to produce decoded image data 34, an extractor/separator 32 which detects an electronic watermark in the image data 34 inputted thereto and outputs detected WM data 35, and a WM data amount detector 33 which detects an WM data embedding amount for the WM data 35 inputted thereto to output detected WM information 6. The WM information for the WM data 35 is used together with the image analysis data 17 to control the WM embedding controller 14, which will be described later.

Subsequently, description will be given of the WM embedding operation in the third embodiment.

First, operation of the WM detector 30 will be briefly described.

The WM detector 30 is disposed to receive the image data with WM (MPEG2 stream) 5 from the MPEG2 encoder 20 so as to produce the detected WM information 6.

The data 5 is decoded by the MPEG 2 decoding unit 31 into the decoded image data 34. The MPEG 2 decoding unit 31 is not a particular decoding device, but is a general MPEG2 decoder. Therefore, description thereof will be avoided. The data 34 is inputted to the WM data extractor/separator 32 to produce the detected WM data 35. The extractor/separator 32 is used to extract and to separate WM data contained in the data 34 and executes part of general WM detection processing.

Specifically, the extractor/separator 32 executes processing for the image data with WM such as re-arrangement, superimposition, averaging, normalization, and calculation of correlation coefficients. As a result, the extractor/separator 32 decreases original image components and hence relatively increases WM components.

The contents of the processing executed by the extractor/separator 32 vary depending on the type of WM data. The present invention is not therefore restricted by the above example. That is, it is only necessary to execute processing to extract and to separate WM data employed.

The detected WM data 35 is inputted to the WM data amount detector 33 and is processed into the detected WM information 6. The detector 33 is disposed to obtain, form the WM data 35, information items necessary to control the WM embedding operation such as the amount, the strength, and reliability of embedded WM data. To obtain the information items, the detector 33 conducts in general statistic processing such as calculation and accumulation of mean values and values of variance.

The contents of the processing executed by the WM data amount detector 33 vary depending on the type of WM data. Therefore, the present invention is not restricted by the above example. That is, it is only necessary to execute processing to obtain information required for the embedding operation of WM data employed.

The third embodiment provides another method of solving the problem above in which when the fading of the WM data increases and exceeds the WM detection limit, a state in which the WM information cannot be restored continues. Concretely, the detected WM information 6 from the WM detector 30 is also supplied to the WM embedding controller 14 so that the embedding WM data 16 can be controlled according to a state of the WM data detected in the image data after the MPEG2 encoding. For example, in a case in which the WM amount detected in the WM information 6 becomes equal to or less than a threshold value required to detect the WM data, the WM embedding device 10 appropriately changes the embedding WM data 16 to achieve the WM level correction. This prevents an event that the WM data embedded in the image data after the MPEG2 encoding becomes equal to or less than the threshold value.

Moreover, in addition to the WM level correction control operations, an embedding position control operation may also be conducted to change the position in the screen to embed the WM data according to the value of the embedding WM data.

In the embedding position control operation, the WM embedding position is changed in the screen according to the state of the WM data such that the deterioration in the picture quality by the WM embedding operation is less clearly perceived.

In general, in an original image in which brightness, hue, or the like abruptly changes, even if the WM data is embedded and the screen data is accordingly changed, such a change cannot be clearly perceived because of the change in the original image. Conversely, in an original image in which brightness, hue, or the like slightly changes, if the WM data is embedded and the screen data is further changed, such a change is easily perceived because of uniformity of the original image.

For example, in an operation to increase the amount of embedding WM data, since the deterioration of the picture quality can easily take place by the increase in the embedding WM data amount, the embedding position control operation is achieved to reduce the amount of WM data to be embedded in a section of the original image at which brightness, hue, or the like slightly changes in the screen. Conversely, the embedding position control operation may be achieved to increase the amount of WM data to be embedded in a contour section of the original image at which brightness, hue, or the like remarkably changes in the screen. Moreover, the control operations above may be simultaneously conducted to reduce the embedding WM data amount in a section with a slight change of brightness, hue, or the like and to increase the embedding WM data amount in a contour section with an abrupt change thereof. Discrimination between a flat section with a slight change and a contour section with a considerable change can be conducted using a feature detecting function commonly used in the image processing technique and hence detailed description thereof will be avoided.

In addition, the amount of the WM data to be embedded, the strength of embedded WM data, and the embedding position thereof may be controlled for a particular frequency component of the WM data. For example, in a case in which the image information amount signal indicates that a particular spatial frequency component occupies a large part, if WM data having a frequency similar to the pertinent spatial frequency is embedded, interference occurs therebetween to form an interference pattern. This results in a problem that the WM data is clearly perceived. To cope with this drawback, the following steps are required. (1) The particular spatial frequency component which has a spatial frequency similar to the spatial frequency of the original image data and which causes the interference pattern is minimized in the original WM data. (2) In each partition area of the screen, a spatial frequency spectrum of the original image data is examined. Only in screen areas in which the interference pattern possibly occurs, the strength of embedded WM data is lowered. (3) In each partition area of the screen, a spatial frequency spectrum of original image data is examined, in screen areas in which the interference pattern possibly occurs, the strength of a particular spatial frequency component which causes the interference pattern is lowered in the original WM data.

In this situation, the WM data is beforehand subdivided into components of a plurality of bands on the spatial frequency axis. For example, there are detected the WM data components of spatial frequency bands which can be superimposed, without causing any problem such as occurrence of the interference pattern, onto primary spatial frequency components of original image data obtained from the image information amount signal. The WM data components are then added to the original image data in the WM embedding. Alternatively, WM data components of spatial frequency bands which possibly cause an interference pattern are multiplied by a coefficient less than a coefficient for WM data components of other spatial frequency bands. WM data resultant from the multiplication is added to the original image data in the WM embedding.

The spatial frequency spectrum of WM data is a broad spectrum in general. That is, energy rarely concentrates on a particular spatial frequency in the WM data. Therefore, even when the WM data component of the particular spatial frequency is removed from the WM data, it hardly occurs that the WM detecting capability is adversely influenced.

Incidentally, the picture quality is easily lowered in general when the amount of embedded WM data is increased as above. However, the processing above is executed in a state in which the WM data 16 easily fades in the MPEG2 encoding operation. Therefore, the increase in the amount of embedded WM data cancels out the decrease in the WM data by the MPEG2 encoding operation. As a result, the amount of WM data embedded in the MPEG2 stream is kept unchanged, and hence the problem of the deterioration in the picture quality rarely occurs.

The present invention is not restricted by the configurations of various sections combined with each other to achieve the respective functions in the embodiments above. There may be used other configurations in other combinations. The sections to implement the respective functions may be implemented using electronic circuits or may be implemented by combining microprocessors with software.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An electronic watermark embedding apparatus for embedding an electronic watermark in image data, comprising:

electronic watermark data generating means for generating data of an electronic watermark to be embedded in the image data;

electronic watermark embedding means for embedding the electronic watermark in the image data;

image information amount detecting means for detecting an amount of information of the image data in which the electronic watermark is to be embedded and for outputting a signal representing the detected image information amount; and encoding information detecting means for detecting encoding information from the image data in which the electronic watermark has been embedded and which has been encoded, and feeding the detected encoding information back to the electronic watermark embedding means, said electronic watermark embedding means controlling an amount of the electronic watermark data to be embedded in the image data according to the image information amount signal detected by said image information amount detecting means and the encoding information detected by said encoding information detecting means and fed back to the electronic watermark embedding means.

2. An electronic watermark embedding apparatus for embedding an electronic watermark in image data, comprising:

electronic watermark data generating means for generating data of an electronic watermark to be embedded in the image data;

electronic watermark embedding means for embedding the electronic watermark in the image data;

image information amount detecting means for detecting an amount of information of the image data in which the electronic watermark is to be embedded and for outputting a signal representing the detected image information amount; and encoding information detecting means for detecting encoding information from the image data in which the electronic watermark has been embedded and which has been encoded, and feeding the detected encoding information back to the electronic watermark embedding means, said electronic watermark embedding means controlling a position of the image data at which the electronic watermark data is embedded in the image data according to the image information amount signal detected by said image data amount detecting means and the encoding information detected by said encoding information detecting means and fed back to the electronic watermark embedding means.

3. An electronic watermark embedding apparatus for embedding an electronic watermark in image data, comprising:

electronic watermark data generating means for generating data of an electronic watermark to be embedded in the image data;

electronic watermark embedding means for embedding the electronic watermark in the image data;

image information amount detecting means for detecting an amount of information of the image data in which the electronic watermark is to be embedded and for outputting a signal representing the detected image information amount; and encoding information detecting means for detecting encoding information from the image data in which the electronic watermark has been embedded and which has been encoded, and feeding the detected encoding information back to the electronic watermark embedding means, said electronic watermark embedding means controlling strength of the electronic watermark data to be embedded in the image data according to the image information amount signal detected by said image data amount detecting means and the encoding information detected by said encoding information detecting means and fed back to the electronic watermark embedding means.

4. An electronic watermark embedding apparatus according to claim 1, wherein said electronic watermark embedding means controls an amount of the electronic watermark data of a particular spatial frequency component to be embedded in the image data according to the image information amount signal.

5. An electronic watermark embedding apparatus according to claim 2, wherein said electronic watermark embedding means controls a position of the image data at which the electronic watermark data of a particular spatial frequency component is embedded in the image data according to the image information amount signal.

6. An electronic watermark embedding apparatus according to claim 3, wherein said electronic watermark embedding means controls strength of the electronic watermark data of a particular spatial frequency component to be embedded in the image data according to the image information amount signal.

7. An electronic watermark embedding apparatus for embedding an electronic watermark in image data, comprising:

electronic watermark data generating means for generating data of an electronic watermark to be embedded in the image data;

electronic watermark embedding means for embedding the electronic watermark in the image data;

image information amount detecting means for detecting an amount of information of the image data in which the electronic watermark has been embedded and for outputting a signal representing the detected image information amount; and encoding information detecting means for detecting encoding information from the image data in which the electronic watermark has been embedded and which has been encoded, and feeding the detected encoding information back to the electronic watermark embedding means, said electronic watermark embedding means controlling an amount of the electronic watermark data to be embedded in the image data according to the image information amount signal detected by said image data amount detecting means and the encoding information detected by said encoding information amount detecting means and fed back to the electronic watermark embedding means.

8. An electronic watermark embedding apparatus for embedding an electronic watermark in image data, comprising:
   electronic watermark data generating means for generating data of an electronic watermark to be embedded in the image data;
   electronic watermark embedding means for embedding the electronic watermark in the image data;
   image information amount detecting means for detecting an amount of information of the image data in which the electronic watermark has been embedded and for outputting a signal representing the detected image information amount; and
   encoding information detecting means for detecting encoding information of the image data in which the electronic watermark has been embedded and which has been encoded, and feeding the detected encoding information back to the electronic watermark embedding means,
   said electronic watermark embedding means controlling a position of the image data at which the electronic watermark data is embedded in the image data according to the image information amount signal and the encoding information detected by said image information amount detecting means and fed back to the electronic watermark embedding means.

9. An electronic watermark embedding apparatus for embedding an electronic watermark in image data, comprising:
   electronic watermark data generating means for generating data of an electronic watermark to be embedded in the image data;
   electronic watermark embedding means for embedding the electronic watermark in the image data;
   image information amount detecting means for detecting an amount of information of the image data in which the electronic watermark has been embedded and for outputting a signal representing the detected image information amount; and
   encoding information detecting means for detecting encoding information from the image data in which the electronic watermark has been embedded and which has been encoded, and feeding the detected encoding information back to the electronic watermark embedding means,
   said electronic watermark embedding means controlling strength of the electronic watermark data to be embedded in the image data according to the image information amount signal detected by said image information amount detecting means and the encoding information detected by said image information detecting means and fed back to the electronic watermark embedding means.

10. An electronic watermark embedding apparatus according to claim 7, wherein said electronic watermark embedding means controls an amount of the electronic watermark data of a particular spatial frequency component to be embedded in the image data according to the image information amount signal.

11. An electronic watermark embedding apparatus according to claim 8, wherein said electronic watermark embedding means controls a position of the image data at which the electronic watermark data of a particular spatial frequency component is embedded in the image data according to the image information amount signal.

12. An electronic watermark embedding apparatus according to claim 9, wherein said electronic watermark embedding means controls strength of the electronic watermark data of a particular spatial frequency component to be embedded in the image data according to the image information amount signal.

13. An electronic watermark embedding apparatus according to claim 1, wherein said encoding information detecting means outputs, as the encoding information, at least one of a quantizer scale code value, an MQUANT value, and a quantizer matrix value in an ISO/IEC standard 13818 (to be abbreviated as MPEG2 herebelow).

14. An electronic watermark embedding apparatus according to claim 13, wherein said encoding information (to be referred to as y herebelow) has a relationship of y=f(x), where f represents a function, with a value (to be referred to as x herebelow) including at least one of the quantizer scale code value, the MQUANT value, and the quantizer matrix value, said relationship including a relationship of $dy/dx \geq 0$.

15. An electronic watermark embedding apparatus according to claim 1, wherein said electronic watermark embedding means conducts a control operation to increase the amount of the electronic watermark to be embedded in the image data within a predetermined range when an amount of image information indicated by the image information amount signal increases.

16. An electronic watermark embedding apparatus according to claim 2, wherein said electronic watermark embedding means changes, when an amount of image information indicated by the image information amount signal changes, the position of the image data at which the electronic watermark data is embedded in the image data to a position at which the electronic watermark cannot easily fade.

17. An electronic watermark embedding apparatus according to claim 3, wherein said electronic watermark embedding means conducts a control operation to increase the strength of the electronic watermark to be embedded in the image data within a predetermined range when an amount of image information indicated by the image information amount signal increases.

18. An electronic watermark embedding apparatus according to claim 1, wherein said electronic watermark embedding means operates in cooperation with a format converting unit to convert the image data in which the electronic watermark has been embedded into data of an MPEG2 format.

19. An electronic watermark embedding apparatus for embedding an electronic watermark in image data, comprising:
   electronic watermark data generating means for generating data of an electronic watermark to be embedded in the image data;
   electronic watermark embedding means for embedding the electronic watermark in the image data;
   format converting means for converting the image data into data of an MPEG2 format; and
   converted image information detecting means for detecting an amount of information of the image data converted by said format converting means into data of an MPEG2 format and for outputting a signal representing the converted image information, and feeding the converted image information signal back to the electronic watermark embedding means;

said electronic watermark embedding means controlling at least one of an amount of the electronic watermark data to be embedded in the image data and strength thereof according to the converted image information signal fed back to the electronic watermark embedding means.

20. A format converter for converting a format of the image data into an MPEG2 format, comprising:
   electronic watermark data generating means for generating data of an electronic watermark to be embedded in the image data;
   electronic watermark embedding means for embedding the electronic watermark in the image data;
   format converting means for converting the image data into data of an MPEG2 format; and
   converted image information detecting means for detecting an amount of information of the image data converted by said format converting means into data of an MPEG2 format and for outputting a signal representing the converted image information, and feeding the converted image information signal back to the electronic watermark embedding means;
   said electronic watermark embedding means controlling at least one of an amount of the electronic watermark data to be embedded in the image data and strength thereof according to the converted image information signal fed back to the electronic watermark embedding means.

21. An electronic watermark embedding method of embedding an electronic watermark in image data, comprising the steps of:
   generating electronic watermark data of an electronic watermark to be embedded in the image data;
   embedding the electronic watermark in the image data using an electronic watermark embedding means;
   converting the image data in which the electronic watermark data has been embedded into data of an MPEG2 format;
   detecting an amount of information of the image data converted into data of the MPEG2 format and outputting a signal representing the detected amount of information to be fed back to the electronic watermark embedding means; and
   controlling at least one of an amount of the electronic watermark data to be embedded in the image data and strength thereof according to the detected amount of information of the image data fed back to the electronic watermark embedding means.

22. An electronic watermark embedding apparatus for embedding an electronic watermark in image data, comprising:
   electronic watermark data generating means for generating data of an electronic watermark to be embedded in the image data;
   electronic watermark embedding means for embedding the electronic watermark in the image data; and
   format converting means for converting the image data into data of an MPEG2 format,
   said format converting means comprising image information amount detecting means for detecting an amount of information of the image data converted into data of an MPEG2 format and for outputting an image information amount signal, and feeding the image information amount signal back to the electronic watermark embedding means, wherein
   said electronic watermark embedding means controlling at least one of an amount of the electronic watermark data to be embedded in the image data and strength thereof according to the image information amount signal fed back to the electronic watermark embedding means.

23. A format converter for converting a format of image data into an MPEG2 format, said format converter operating in cooperation with:
   electronic watermark data generating means for generating data of an electronic watermark to be embedding in the image data;
   electronic watermark embedding means for embedding the electronic watermark in the image data;
   format converting means for converting the image data into data of an MPEG2 format,
   said format converting means including image information amount detecting means for detecting an amount of information of the image data converted into data of an MPEG2 format and for outputting a signal representing the detected image information amount, and feeding the image information amount signal back to the electronic watermark embedding means; and
   said electronic watermark embedding means detecting a quantizing step for a high-frequency component of spatial frequency components of the image data according to the image information amount signal, fed back to the electronic watermark embedding means, and controlling at least one of an amount of the electronic watermark data to be embedded in the image data and strength thereof.

24. An electronic watermark embedding apparatus for embedding an electronic watermark in image data, comprising:
   electronic watermark data generating means for generating data of an electronic watermark to be embedded in the image data;
   electronic watermark embedding means for embedding the electronic watermark in the image data; and
   format converting means for converting said image data into data of an MPEG2 format,
   said format converting means including image information amount detecting means for detecting an amount of information of the image data converted into data of an MPEG2 format and for outputting a signal representing the detected image information amount, and feeding the image information amount signal back to the electronic watermark embedding means,
   said electronic watermark embedding means detecting a quantizing step for a high-frequency component of spatial frequency components of the image data according to the image information amount signal, fed back to the electronic watermark embedding means, and controlling at least one of an amount of the electronic watermark data to be embedded in the image data and strength thereof.

25. An electronic watermark embedding method of embedding an electronic watermark in image data, comprising the steps of:
   generating data of an electronic watermark to be embedded in the image data;
   embedding the electronic watermark in the image data using an electronic watermark embedding means; and converting the image data in which the electronic watermark has been embedded into data of an MPEG2 format, detecting an amount of information of the image data converted into data of an MPEG2 format and outputting a signal representing the detected image information amount to be fed back to the electronic watermark embedding means; and detecting a quantizing step for a high-frequency component of spatial frequency components of the image data according to the image information amount, fed back to the electronic watermark embedding means, and controlling at least one of an amount of the electronic watermark data to be embedded in the image data and strength thereof according to the detecting result.

26. An electronic watermark embedding apparatus for embedding an electronic watermark in image data, comprising:

electronic watermark data generating means for generating data of an electronic watermark to be embedded in the image data;

electronic watermark data embedding means for embedding data of the electronic watermark in the image data; and electronic watermark information amount detecting means for detecting information of the electronic watermark in the image data in which the electronic watermark has been embedded and which has been encoded and for outputting electronic watermark information, and feeding the detected electronic watermark information back to the electronic watermark data embedding means, said electronic watermark embedding means controlling an amount of the electronic watermark data to be embedded in the image data according to the detected electronic watermark information fed back to the electronic watermark embedding means.

27. An electronic watermark embedding apparatus for embedding an electronic watermark in image data, comprising:

electronic watermark data generating means for generating data of an electronic watermark to be embedded in the image data;

electronic watermark data embedding means for embedding data of the electronic watermark in the image data; and electronic watermark information amount detecting means for detecting information of the electronic watermark in the image data in which the electronic watermark has been embedded and which has been encoded and for outputting electronic watermark information, and feeding the detected electronic watermark information back to the electronic watermark data embedding means, said electronic watermark embedding means controlling a position of the image data at which the electronic watermark data is embedded in the image data according to the detected electronic watermark information fed back to the electronic watermark embedding means.

28. An electronic watermark embedding apparatus for embedding an electronic watermark in image data, comprising:

electronic watermark data generating means for generating data of an electronic watermark to be embedded in the image data;

electronic watermark data embedding means for embedding data of the electronic watermark in the image data; and electronic watermark information amount detecting means for detecting information of the electronic watermark in the image data in which the electronic watermark has been embedded and which has been encoded and for outputting electronic watermark information, and feeding the detected electronic watermark information back to the electronic watermark data embedding means, said electronic watermark embedding means controlling strength of the electronic watermark data to be embedded in the image data according to the detected electronic watermark information fed back to the electronic watermark embedding means.

29. An electronic watermark embedding apparatus according to claim 26, wherein said electronic watermark embedding means controls an amount of the electronic watermark data of a particular spatial frequency component to be embedded in the image data according to the electronic watermark information.

30. An electronic watermark embedding apparatus according to claim 27, wherein said electronic watermark embedding means controls a position of the image data at which the electronic watermark data of a particular spatial frequency component is embedded in the image data according to the electronic watermark information.

31. An electronic watermark embedding apparatus according to claim 28, wherein said electronic watermark embedding means controls strength of the electronic watermark data of a particular spatial frequency component to be embedded in the image data according to the electronic watermark information.

32. An electronic watermark embedding apparatus according to claim 26, wherein said electronic watermark information amount detecting means detects information regarding the electronic watermark in the image data in which the electronic watermark has been imbedded and for which image data compression processing is then executed according to an ISO/IEC standard 13818 (abbreviated as MPEG2) and outputs the information.

33. An electronic watermark embedding apparatus according to claim 26, wherein said electronic watermark embedding means conducts a control operation to decrease the amount of an electronic watermark to be embedded in the image data within a predetermined range when an amount of electronic watermark information indicated by the electronic watermark information increases.

34. An electronic watermark embedding apparatus according to claim 26, wherein said electronic watermark embedding means conducts, when an amount of electronic watermark information indicated by the electronic watermark information decreases, a control operation to increase the amount of an electronic watermark to be embedded in the image data within a predetermined range.

35. An electronic watermark embedding apparatus according to claim 27, wherein said electronic watermark embedding means changes, when an amount of electronic watermark information indicated by the electronic watermark information decreases, the position of the image data at which an electronic watermark is embedded in the image data to a position at which the electronic watermark cannot easily fade.

36. An electronic watermark embedding apparatus according to claim 27, wherein said electronic watermark embedding means changes, when an amount of electronic watermark information indicated by the electronic watermark information increases, the position of the image data at which an electronic watermark is embedded in the image data to a position at which the electronic watermark cannot easily be perceived.

37. An electronic watermark embedding apparatus according to claim 28, wherein said electronic watermark embedding means conducts a control operation to decrease the strength of the electronic watermark signal to be embedded in the image data within a predetermined range when an amount of electronic watermark information indicated by the electronic watermark information increases.

38. An electronic watermark embedding apparatus according to claim 28, wherein said electronic watermark embedding means conducts a control operation to increase strength of the electronic watermark signal to be embedded in the image data within a predetermined range when an amount of electronic watermark information indicated by the electronic watermark information decreases.

39. An electronic watermark embedding apparatus according to claim 26, wherein said electronic watermark embedding means operates in cooperation with a format converting unit to convert the image data in which the electronic watermark has been embedded into data of an MPEG2 format.

40. An electronic watermark embedding method of embedding an electronic watermark in image data, comprising the steps of:
- providing data of an electronic watermark to be embedding in the image data;
- embedding the electronic watermark in the image data;
- detecting and feeding back information regarding the electronic watermark in the image data in which the electronic watermark has been embedded; and
- controlling at least one of an amount of the electronic watermark data to be embedded in the image data and strength thereof according to the information regarding the electronic watermark in the image data which is detected and fed back by the detecting step.

* * * * *